United States Patent [19]

Tsukada

[11] Patent Number: 5,390,088
[45] Date of Patent: Feb. 14, 1995

[54] VEHICLE LAMP DEVICE

[75] Inventor: Hiroyuki Tsukada, Isehara, Japan

[73] Assignee: Ichikoh Industries, Ltd., Tokyo, Japan

[21] Appl. No.: 167,146

[22] Filed: Dec. 16, 1993

[30] Foreign Application Priority Data

Dec. 16, 1992 [JP] Japan .............................. 4-086469[U]
Jan. 22, 1993 [JP] Japan .............................. 5-001357[U]

[51] Int. Cl.$^6$ .................................................. F21M 3/00
[52] U.S. Cl. ........................................ 362/61; 362/66; 362/267; 362/282; 362/310
[58] Field of Search ...................... 362/61, 267, 66, 80, 362/310, 457, 282, 427

[56] References Cited

U.S. PATENT DOCUMENTS

| | | | |
|---|---|---|---|
| 5,032,964 | 7/1991 | Endo et al. | 362/66 X |
| 5,111,368 | 5/1992 | Suzuki et al. | 362/61 |
| 5,130,904 | 7/1992 | Ohshio | 362/61 |
| 5,195,815 | 3/1993 | Watanabe et al. | 362/61 |
| 5,285,357 | 2/1994 | Makita | 362/61 |

FOREIGN PATENT DOCUMENTS 4-282501 10/1992 Japan .

*Primary Examiner*—Ira S. Lazarus
*Assistant Examiner*—Thomas M. Sember
*Attorney, Agent, or Firm*—Foley & Lardner

[57] ABSTRACT

A vehicle lamp device includes a tiltable reflector mounted in a housing; a back opening formed in a back wall of the housing; a rubber cover for sealing a gap between the back wall and a back portion of the reflector; a cylindrical portion surrounding the back opening formed on the housing back wall; a cylindrical supporting wall formed on the back wall, the supporting wall being spaced outside the cylindrical portion surrounding the back opening and extends backward; an annular groove formed between the back-opening-surrounding portion and the supporting wall; a set ring member having a flat set face, for pressing the rubber cover to the housing back wall from behind; an inward-jutting projection formed on the supporting wall, for supporting the set ring member; a peripheral portion of the rubber cover provided with a horizontally-extending cylindrical portion to be inserted into the annular groove and a to-be-sandwiched potion perpendicular to the to-be-inserted portion of the rubber cover; and an inward-extending flange formed on the back-opening-surrounding portion of the housing back wall, for sandwiching the to-be-sandwiched portion of the rubber cover in cooperation with the flat set face of the set ring member. An annular space is formed between the inserted portion of the rubber cover and the supporting wall of the housing back wall. The to-be-sandwiched portion of the rubber cover is sandwiched only from directions of the thickness of the rubber cover.

18 Claims, 9 Drawing Sheets

VEHICLE LAMP DEVICE

BACKGROUND OF THE INVENTION

1. Field of the Invention

This invention relates to a vehicle lamp device including a tiltable reflector mounted in a housing a back wall of which is provided with an opening, a gap between the back wall of the housing and a back portion of the reflector being sealed with a rubber cover.

2. Description of the Prior Art

Heretofore, a vehicle lamp device is well known as shown in FIG. 10.

Referring to FIG. 10, reference numeral 1 denotes a housing. A lens 2 is mounted on a front opening of the housing 1. A circular opening 4 is formed in a back wall 3 of the housing 1. A portion 5 of the back wall 3 surrounding the circular opening 4 is formed cylindrical. An annular groove 6 concentric with the circular opening 4 is formed on the back wall outside the cylindrical portion 5.

A reflector 8 having a bulb 7 is mounted in the housing 1. The reflector 8 is supported by an adjustment mechanical means (not shown) and can be tilted thereby. A back portion 9 of the reflector 8 faces the circular back opening 4.

A gap H between the reflector back portion 9 and the cylindrical portion 5 of the housing back wall 3 is sealed with an annular rubber cover 10 by which water is inhibited from coming in.

FIG. 11 is an enlarged view showing a part of FIG. 10. The annular rubber cover 10 has an inner cylindrical portion 10a, an outer cylindrical portion 10b, and a flexible portion 10c linking the inner portion 10a to the outer cylindrical portion 10b.

The inner cylindrical portion 10a is fit to the reflector back portion 9 and is fixed to the reflector 8 with a cap 11. The cap 11 is fixed to the back portion 9 with the screw 11'. The outer cylindrical portion 10b is inserted into the annular groove 6 and is fixed thereto with a metallic set ring member 12. The set ring member 12 as a portion 13 to be inserted. The portion 13 has an elastic engagement claw 14. When the set ring member 12 is pressed from behind, the to-be-inserted portion 13 of the set ring member 12 is inserted into the annular groove 6. The elastic engagement claw 14 serves to fix the metallic set ring member 12 to the housing back wall 3.

However, to insert the portion 13 into the annular groove 6, it must be pressed with great force because the rubber cover 10 is designed to be sandwiched between the engagement claw 14 and the housing cylindrical portion 5 from directions perpendicular to an inserting direction of the to-be-inserted portion 13. That is, in the conventional vehicle lamp device, it is difficult to insert the portion 13 of the metallic set ring member 12 into the annular groove 6.

Further, there is a problem in that the deformation of the engagement claw 14 makes it difficult to be tightly engaged with the annular groove 6.

Another prior art vehicle lamp device is disclosed in Japanese Patent Application Laid-open No. heisei 4-282501.

In this prior art, a rubber cover is fixed to an annular portion of a housing (lamp body) by means of a cylindrical set ring member. The set ring member and the housing each have an engagement portion. To fix the set ring member to the housing, the set ring member is inserted into the annular portion of the housing and is engaged with it by means of their engagement portions. The rubber cover is sandwiched between the annular portion of the housing and the set ring member. Inward force from the directions perpendicular to the inserting direction of the rubber cover is applied to the rubber cover when the rubber cover is inserted. Therefore, its insertion is not easily carried out. Further, generally, the set ring member generally has a complicated construction. It is an object of the invention to provide a vehicle lamp device in which the set ring member whose structure is simple causes the rubber cover to be pressed for correctly sealing the gap and be easily fixed to the housing.

SUMMARY OF THE INVENTION

To accomplish the object, a vehicle lamp device according to of the present invention includes a tiltable reflector mounted in a housing; a back opening formed in a back wall of the housing; a rubber cover for sealing a gap between the back wall and a back portion of the reflector; a cylindrical portion surrounding the back opening formed on the housing back wall; a cylindrical supporting wall formed on the back wall, the supporting wall being spaced outside the cylindrical portion surrounding the back opening and extends backward; an annular groove formed between the back-opening-surrounding portion and the supporting wall; a set ring member having a flat set face, for pressing the rubber cover to the housing back wall from behind; an inward-jutting projection formed on the supporting wall, for supporting the set ring member; a peripheral portion of the rubber cover provided with a horizontally-extending cylindrical portion to be inserted into the annular groove and a to-be-sandwiched potion perpendicular to the to-be-inserted portion of the rubber cover; and an inward-extending flange formed on the back-opening-surrounding portion of the housing back wall, for sandwiching the to-be-sandwiched portion of the rubber cover in cooperation with the flat set face of the set ring member. An annular space is formed between the inserted portion of the rubber cover and the supporting wall of the housing back wall. The to-be-sandwiched portion of the rubber cover is sandwiched only from directions of the thickness of the rubber cover.

To accomplish the object, another embodiment of a vehicle lamp device according to the present invention includes a tiltable reflector mounted in a housing; a back opening formed in a back wall of the housing; a rubber cover for sealing a gap between the back wall and a back portion of the reflector; a cylindrical portion surrounding the back opening, formed on the housing back wall; a cylindrical supporting wall formed on the housing back wall, the supporting wall being spaced outside the cylindrical portion surrounding the back opening and extends backward; an annular groove formed between the back-opening-surrounding portion and the supporting wall; an outward-extending engagement flange formed on the supporting wall; a set ring member having a cylindrical wall portion and a flat set plate portion, for pressing the rubber cover to the housing back wall from behind; inward-extending engagement claws provided on the cylindrical wall portion of the set ring member, the claws being engaged with the engagement flange; an inward-extending flange formed on the back-opening- surrounding portion; and a peripheral portion of the rubber cover provided with a horizontally-extending cylindrical portion to be inserted into the annular groove and a to-be-sandwiched potion perpendicular to the to-be-inserted portion of the rubber cover. An annular space is formed between the inserted portion of the rubber cover and the supporting wall of the housing back wall. A space is formed between the outward-extending flange and the flat set plate portion of the set ring member. The to-be-sandwiched portion of the rubber cover being sandwiched between the inward-extending flange and an inner portion of the flat set plate portion.

DETAILED DESCRIPTION OF THE EMBODIMENTS

First Embodiment

Figure 1:
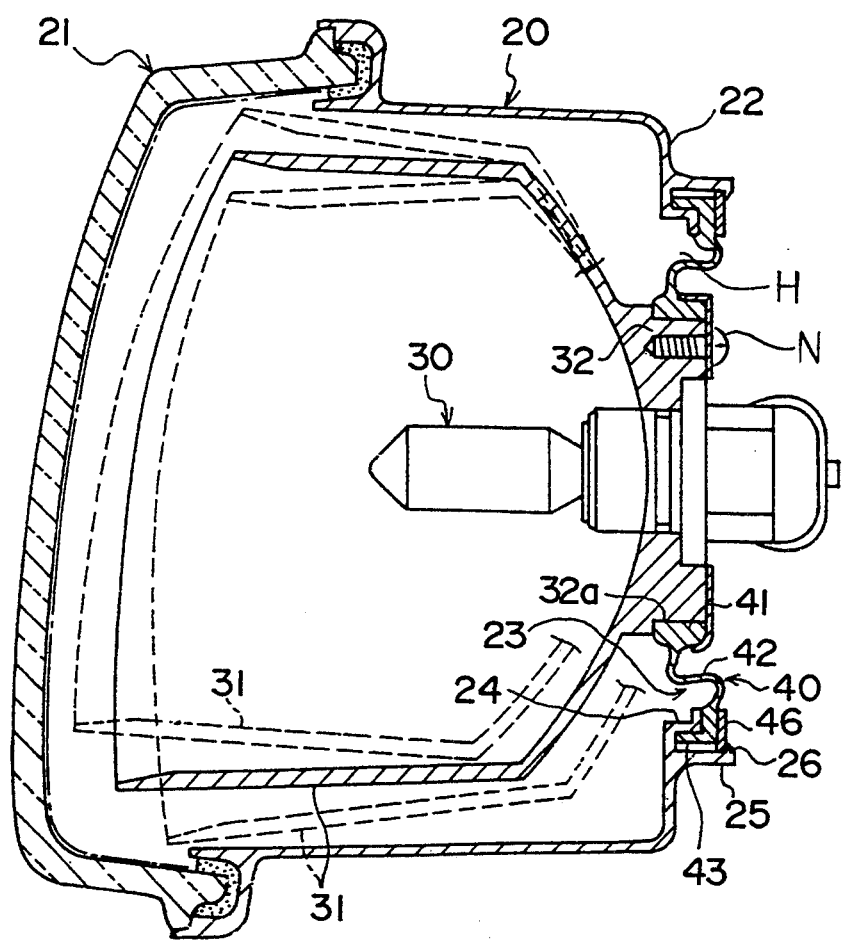
FIG. 1 is a sectional view of a vehicle lamp device according to a first embodiment of the invention.
Figure 2:
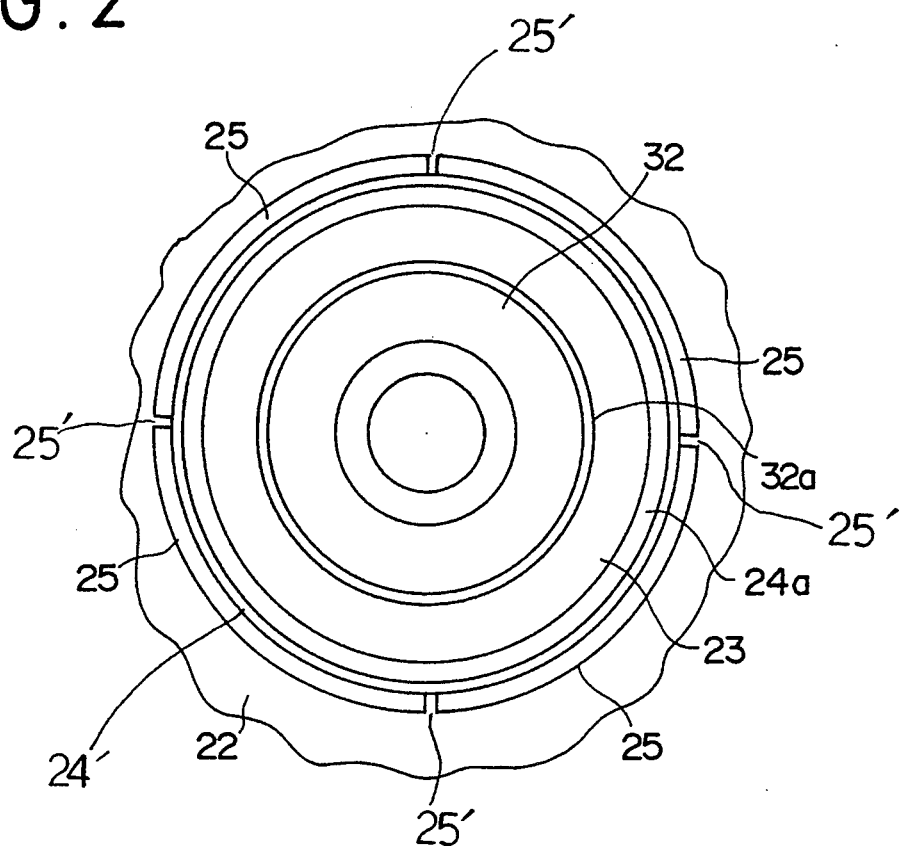
FIG. 2 is a rear elevation of back portions of a housing and a reflector shown in FIG. 1.

Referring to FIGS. 1 and 2, reference numeral 20 denotes a resin housing. A lens 21 is mounted on a front opening of the housing 20. A circular back opening 23 is formed in a back wall 22 of the housing 20. The circular back opening 23 is surrounded by a cylindrical portion 24 of the back wall 22. A cylindrical supporting wall 25 extending backward is formed outside the cylindrical portion 24. The supporting wall 25 is divided into four portions by four slits 25'. There is a space between the cylindrical portion 24 and the supporting wall 25 can to form an annular groove 24'. The slits 25' also serve to drain water which enters into the groove 24'.

Figure 3:
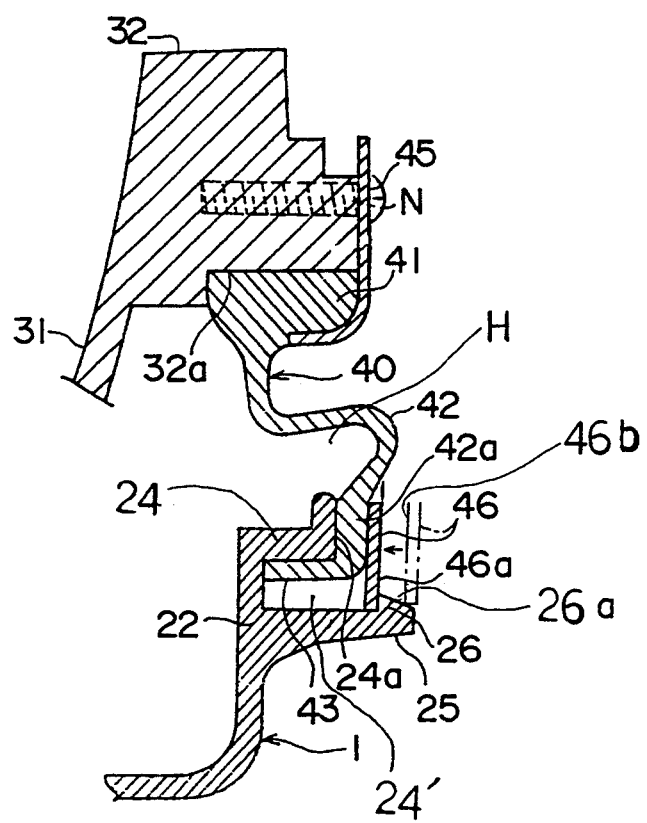
FIG. 3 is a partially sectional enlarged view for describing the fixation of a rubber cover to the housing shown in FIG. 1.

As shown in FIG. 3, the cylindrical portion 24 has a flange 24a extending inward (i.e., toward the center of the housing back opening 23). Likewise, the supporting wall 25 has a projection 26 jutting out inward. The projection 26 has a slope 26a.

A reflector 31 having a bulb 30 is mounted in the housing 20 as shown in FIG. 1. The reflector 31 is supported and tilted by an adjustment mechanical means (not shown) for adjusting an optical axis of the bulb 30 (see broken lines shown in FIG. 1). A back portion 32 of the reflector 31 faces the housing back opening 23.

A gap H between the reflector back portion 32 and the housing back wall 22 is sealed with an annular rubber cover 40 by which water is prevented from entering.

As shown in FIG. 3, the annular rubber cover 40 has an inner cylindrical portion 41, an outer cylindrical portion 43 to be inserted, and a flexible portion 42 linking the inner portion 41 with the outer portion 43. The outer cylindrical portion 43 extends horizontally and is inserted into the groove 24'.

A cylindrical portion 32 for fitting the rubber inner portion 41 therein is formed at the reflector back portion 32. A cap 45 is fixed to the reflector back portion 32 with a screw N so that the cap 45 covers the rubber inner portion 41 and the reflector cylindrical portion 32a from behind.

Figure 4:
FIG. 4 is a sectional view of a set ring member shown in FIG. 3.
Figure 5:
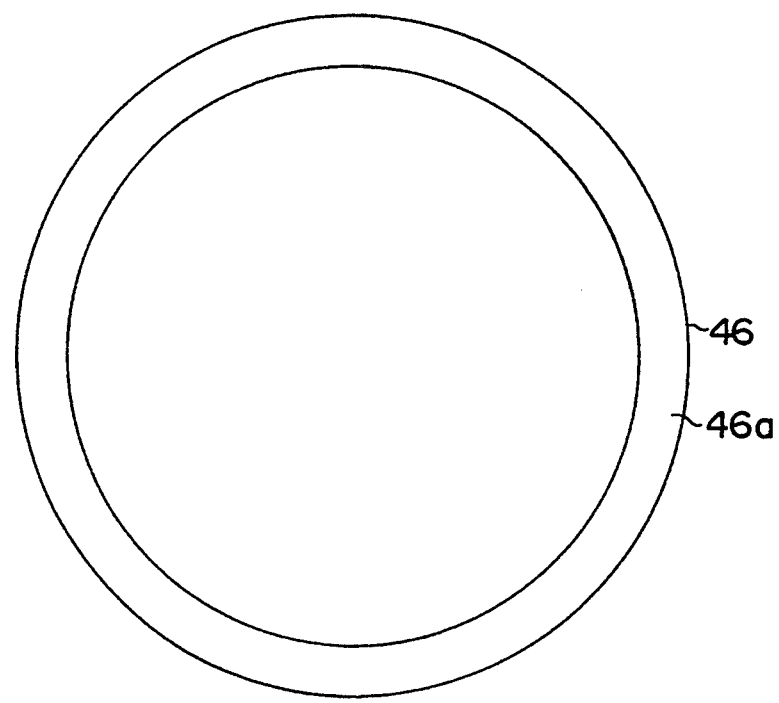
FIG. 5 is a plan view of the set ring member shown in FIG. 3.

The outer cylindrical portion 43 of the rubber cover 40 is inserted into the annular groove 24' so as to contact the cylindrical portion 24 of the housing 20. The rubber outer portion 43 has a portion 42a sandwiched between the housing flange 24a and a set ring member 46. The to-be-sandwiched portion 42a extends in a direction perpendicular to the outer cylindrical portion 43. As shown in FIGS. 4 and 5, the set ring member 46 is a metallic plate having a circular opening, but it may be made of resin. When the set ring member 46 is pressed along the supporting wall 25 in an arrow direction as shown in FIG. 3, a flat set face 46b of the set ring member 46 first comes in contact with the slope 26a of the projection 26. When pressed still more, the flexible supporting wall 25 is bent outward. When pressed still more, the supporting wall 25 returns to its original state. As a result, the projection 26 presses a back face 46a of the set ring member 46. The sandwiched portion 42a of the rubber outer portion 43 is pressed to the housing flange 24a by a combination of the set ring 46 and the projection 26. The set ring member 46 is fixed to the supporting wall 25. Thus, the outer cylindrical portion 43 of the rubber cover 40 is fixed to the back wall 22 of the housing 20 by only the force applied from behind.

Second Embodiment

FIGS. 6 to 9 show a second embodiment of the invention.

In this embodiment, the same numerals are each given to the same components as in the first embodiment.

Figure 6:
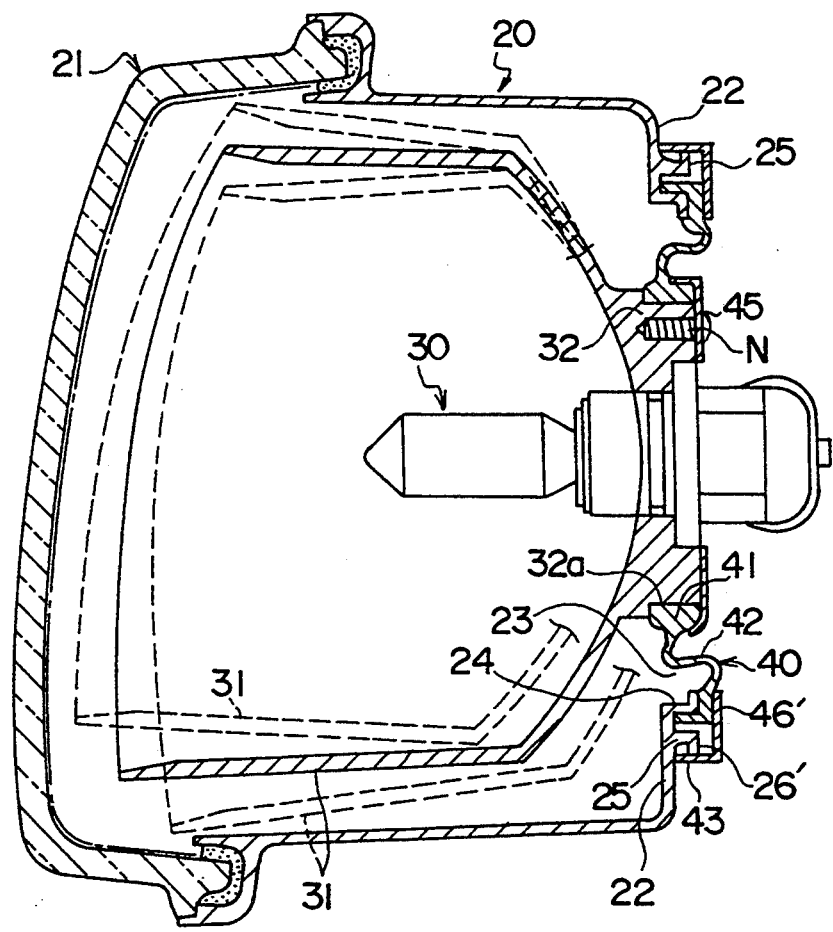
FIG. 6 is a sectional view of a vehicle lamp device according to a second embodiment of the invention.
Figure 8:
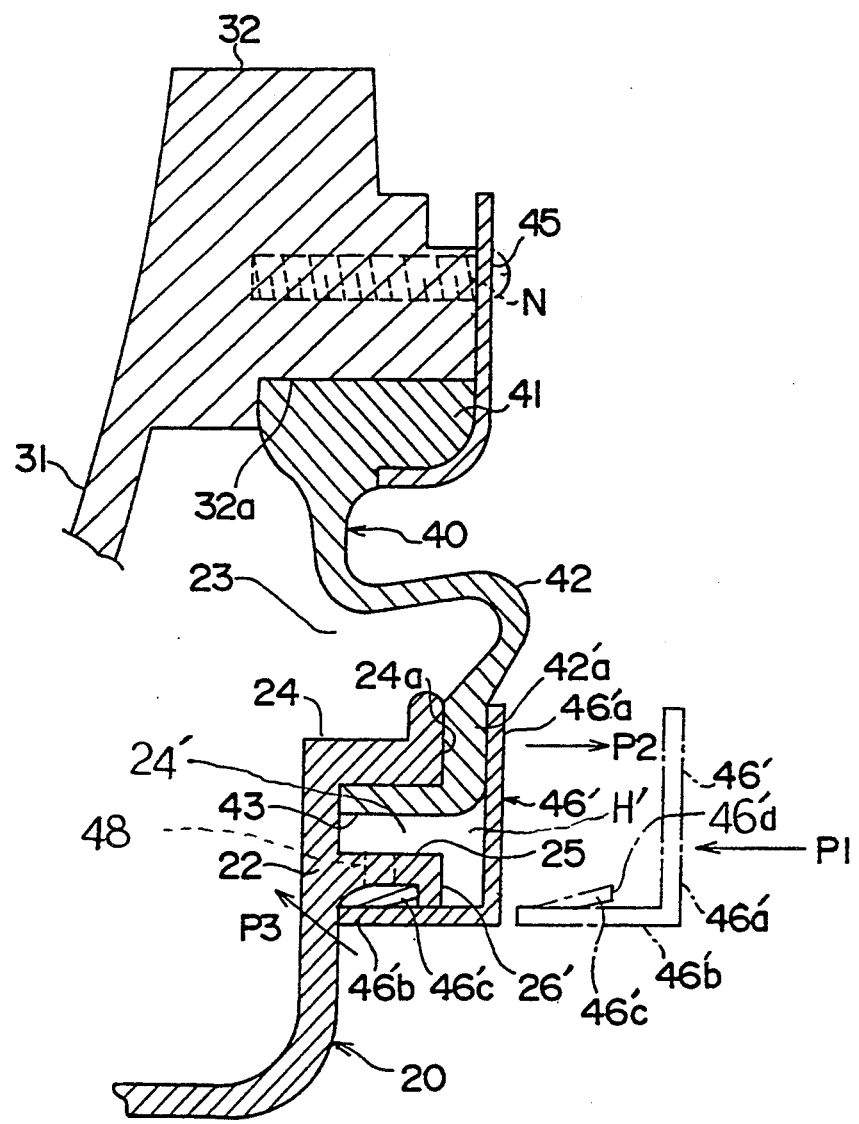
FIG. 8 is a partially sectional enlarged view for describing the fixation of a rubber cover to the housing shown in FIG. 6.
Figure 9:
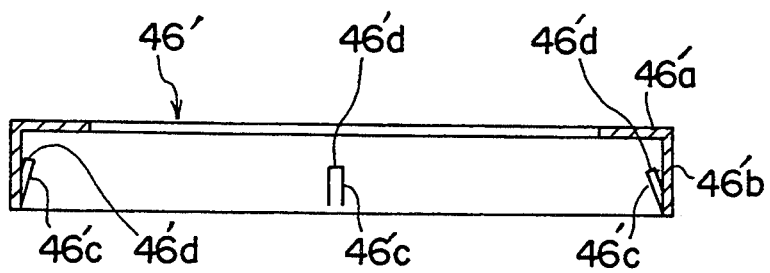
FIG. 9 is a sectional view of a set ring member shown in FIG. 8.
Figure 10:
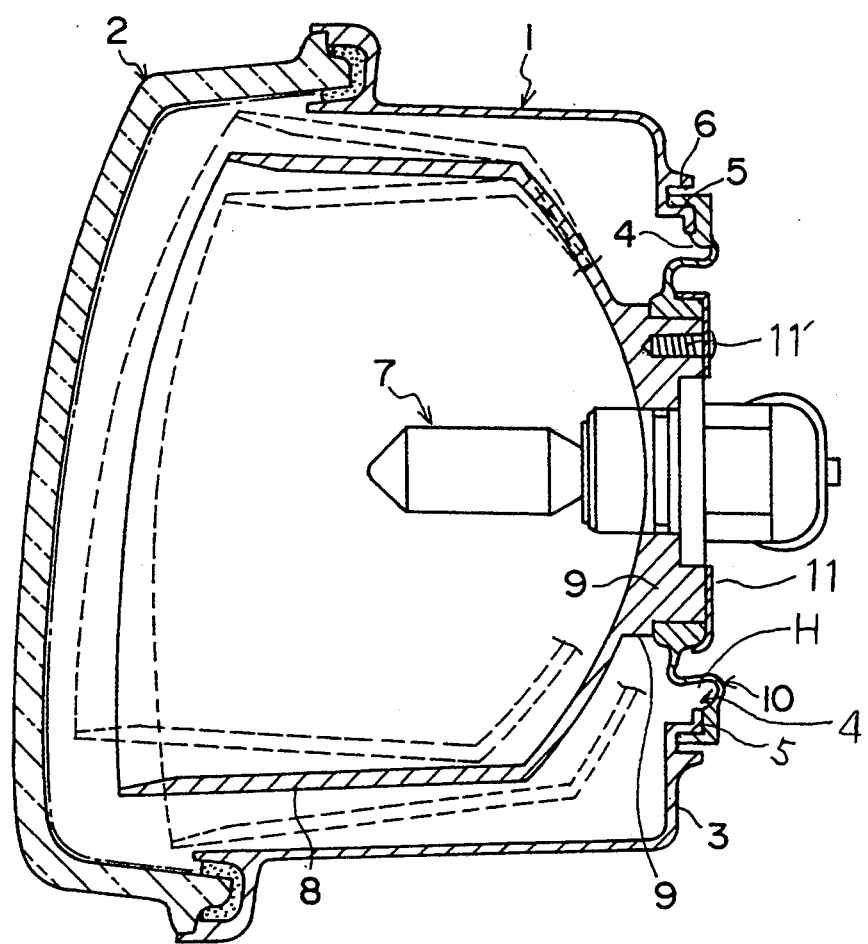
FIG. 10 is a sectional view of a conventional vehicle lamp device.
Figure 11:
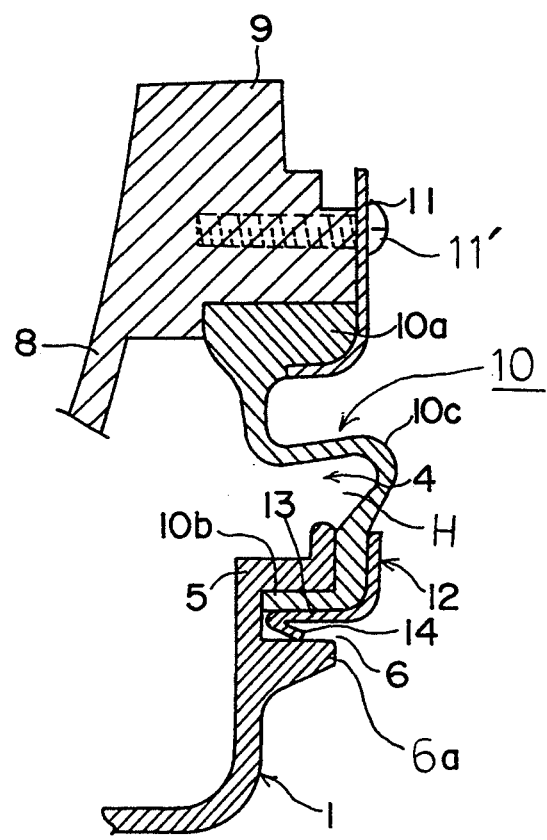
FIG. 11 is a partially sectional enlarged view for describing the fixation of a rubber cover to the housing shown in FIG. 10.

The supporting wall 25 has no slit 25' in the second embodiment. As shown in FIG. 6, the supporting wall 25 has an engagement flange 26' extending outward (i.e., in a direction opposite to the center of the opening 23 of the housing 20). As shown in FIGS. 8 and 9, a set ring member 46' is L-shaped in its cross section and has a flat set portion 46'a and an cylindrical wall portion 46'b. A space H' is formed between the engagement flange 26' and the flat set portion 46'a. A plurality of engagement claws 46'c jutting out inward are each formed on the cylindrical wall 46'b in such a manner that a part of the cylindrical wall portion 46'b is cut out so as not to fall off and is raised inward. As a result, openings are formed in the cylindrical wall portion 46'b. The engagement claws 46'c are elastic and are spaced evenly. As shown in FIG. 8, when the set ring member 46' is pressed to the supporting wall 25 by force P1 in direction of the arrow, the engagement claws 46'c are bent outward and then are engaged with the engagement flange 26' to fix the set ring member 46' to the supporting wall. In this embodiment, force applied to the to-be-sandwiched portion 42'a of the rubber cover 40 can be enlarged because the portion 42'a is sandwiched between an inner portion of the flat set portion 46'a and the inward-extending flange 24a. By force P2 caused by the rubber cover 40 in a direction opposite to the direction of the force P1, the tip 46'd of the engagement claw 46'c is pressed to the engagement flange 26' and is engaged therewith. Therefore, the elastic power of the engagement claw 46'c can be designed to be lessened because the engagement of the claw 46' with the flange 26' is kept by only the resilience P2 of the rubber cover 40.

In this embodiment, the outer cylindrical portion 43 of the rubber cover 40 is pressed by only the force applied from behind and is fixed to the back wall 22 of the housing 20 as in the first embodiment.

When the resilience force P2 is applied to the flat set portion 46'a of the set ring member 46', the tip of the cylindrical wall portion 46'b of the set ring member 46' is also bent in a direction of force P3. Therefore, the fixation of the set ring member 46' to the housing 20 is reinforced even more.

Figure 7:
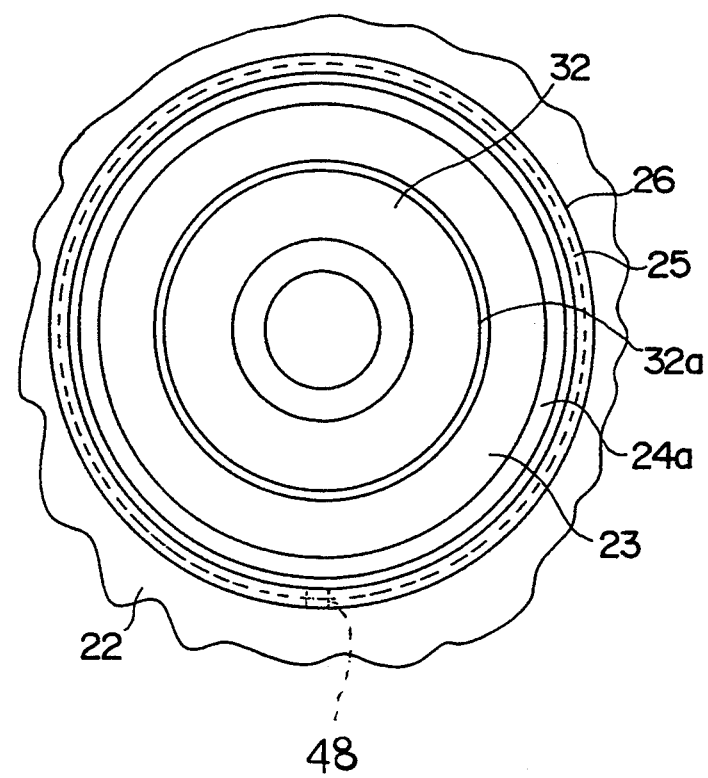
FIG. 7 is a rear elevation of back portions of a housing and a reflector shown in FIG. 6.

Water coming in the groove 24' for some reason is drained from the space H'. This water can be more advantageously drained through a hole 48 formed in the lower portion of the supporting wall 25 as shown in FIGS. 7 and 8.

What is claimed is:

1. A vehicle lamp device comprising:
   a housing having a rear wall, said rear wall having an opening formed therein;
   a tiltable reflector disposed within said housing for reflecting light emitted from a light bulb supported thereon, said reflector having a rear portion, said rear portion having at least a part thereof disposed within said opening;
   a gap in said opening defined by said at least a part of said rear portion and said rear wall;
   an inner cylindrical wall disposed around said opening and supported by said rear wall;
   a flange extending from said inner cylindrical wall in a direction toward a center of said rear opening;
   an outer cylindrical wall extending from said rear wall, said outer cylindrical wall surrounding said inner cylindrical wall;
   an annular groove disposed between said inner and outer cylindrical walls;
   a rubber cover disposed in said gap, said rubber cover comprising an inner portion connectable to said at least a part of said rear portion, an outer cylindrical portion insertable into said annular groove, and a flexible portion between said inner portion and said outer cylindrical portion;
   an annular space located within said annular groove, said annular space defined by said outer cylindrical wall and said outer cylindrical portion of said rubber cover, when said outer cylindrical portion is inserted into said annular groove;
   a set ring member having at least one flat face thereon, said at least one flat face being in a clamping relationship with said flange to clamp said flexible portion therebetween when said ring member is supported by said outer cylindrical wall; and
   an engagement projection extending from said outer cylindrical wall for supporting and holding said set ring member in said clamping relationship.

2. A vehicle lamp device according to claim 1, wherein said set ring member is a circular plate having a circular opening in the center thereof.

3. A vehicle lamp device according to claim 1, wherein said outer wall further comprises a plurality of slits for dividing said outer cylindrical wall into a plurality of supporting wall members, said supporting wall members being in an outwardly bent configuration when said set ring member is supported by said outer cylindrical wall.

4. A vehicle lamp according to claim 3, wherein at least one of said slits is disposed at a lower portion of said outer cylindrical wall in order to provide water drainage for the vehicle lamp.

5. A vehicle lamp according to claim 3, wherein said engaged projection further comprises a sloped surface for guiding said set ring member into said outer cylindrical wall.

6. A vehicle lamp according to claim 5, wherein the height of said sloped surface increases in a direction toward a front of said vehicle lamp.

7. A vehicle lamp according to claim 1, further comprising a cap and screw for connecting said inner portion of said rubber cover to said at least a part of said rear portion.

8. A vehicle lamp according to claim 1, wherein said set ring member is a metal.

9. A vehicle lamp according to claim 1, wherein said set ring member is a resin.

10. A vehicle lamp device according to claim 1, further comprising a lens attached to the front of said housing.

11. A vehicle lamp device comprising:
    a housing having a rear wall, said rear wall having an opening formed therein;
    a tiltable reflector disposed within said housing for reflecting light emitted from a light bulb supported thereon, said reflector having a rear portion, said rear portion having at least a part thereof disposed within said opening;
    a gap in said opening defined by said at least a part of said rear portion and said rear wall;
    an inner cylindrical wall disposed around said opening and supported by said rear wall;
    a first flange extending from said inner cylindrical wall in a direction of a center of said rear opening;
    an outer cylindrical wall extending from said rear wall, said outer cylindrical wall surrounding said inner cylindrical wall;
    an engagement flange extending from said outer wall in a direction opposite to said first flange;
    an annular groove disposed between said inner and outer cylindrical walls;
    a rubber cover disposed in said gap, said rubber cover comprising an inner portion connectable to said at least a part of said rear portion, an outer cylindrical portion insertable into said annular groove, and a flexible portion between said inner portion and said outer portion;
    an annular space located within said annular groove, said annular space defined by said outer cylindrical wall and said outer cylindrical portion of said rubber cover, when said outer cylindrical portion is inserted into said annular groove;
    a set ring member having a flat set plate portion and an outer cylindrical wall portion extending from said flat set plate portion, said flat set plate portion being in a clamping relationship with said first flange to clamp said flexible portion therebetween;
    engagement claws on said ring member outer cylindrical wall portion, said claws coacting with said engagement flange to maintain said flat set plate portion, said first flange and said flexible portion in said clamping relationship; and a space located between said engagement flange and said flat set plate, said space formed when said engagement flange and said engagement claws are in said coacting relationship.

12. A vehicle lamp device according to claim 11, wherein a cross section of said set ring member is L-shaped.

13. A vehicle lamp device according to claim 11, wherein said engagement claw and flange engage each other with a force that is opposite to the force exerted by said clamped rubber cover against said first flange and said flat set plate portion.

14. A vehicle lamp device according to claim 11, further comprising a hole formed in a lower portion of said outer wall in order to provide water drainage for the vehicle lamp, said hole leading from said annular groove to an outer surface of said outer cylindrical wall.

15. A vehicle lamp device according to claim 11, wherein said engagement claws are formed by partially cutting said claws out of said outer cylindrical wall portion and bending said partially cut out claws inward.

16. A vehicle lamp device according to claim 11, wherein said engagement claws are elastic and are evenly spaced around said outer cylindrical wall portion.

17. A vehicle lamp according to claim 11, further comprising a cap and screw for connecting said inner portion of said rubber cover to said at least a part of said rear portion.

18. A vehicle lamp according to claim 11, further comprising a lens attached to the front part of said housing.

* * * * *